United States Patent Office 3,153,021
Patented Oct. 13, 1964

3,153,021
PROCESS FOR PRODUCING CROSS-LINKED SULFONE POLYMERS AND PRODUCT THEREOF
Irving Tashlick, Springfield, Mass., and Harry M. Culbertson, Los Gatos, Calif., assignors to Monsanto Company, a corporation of Delaware
No Drawing. Filed Nov. 14, 1960, Ser. No. 68,635
11 Claims. (Cl. 260—79.3)

The present invention is directed to production of sulfone polymers and more particularly to cross-linked polymers of this type.

Sulfone or sulfonyl polymers are those which contain

groups in the polymer backbone. As a class they are generally known. Of the sulfone polymers presently known, those of particular interest are obtained from reacting stoichiometric equivalents of a donor compound represented by the formula:

$$H-Z-R-Z-H$$

with an acceptor compound represented by the formula:

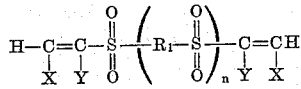

The sulfone polymers so obtained are linear in nature and can be represented by the formula:

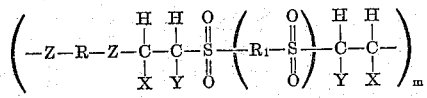

Throughout the representation used, R designates a divalent organic radical, $R_1$ a divalent aliphatic radical free of functional groups, X and Y radicals selected from the class consisting of hydrogen, alkyl and aryl radicals, Z designates a component selected from the class consisting of oxygen and sulfur and $m$ is an integer designating the number of repeating polymer units and $n$ is 0 or 1. The linear polymers so produced are thermoplastic in nature. They have utility as molding compositions, films, fibers, etc. In that they do not readily cross-link, however, they will not exhibit solvent and heat resistance.

Accordingly, it is a principal object of the present invention to provide readily cross-linkable sulfone polymers.

Another object is to provide cross-linked or thermoset sulfone polymers.

Another object is that of obtaining sulfone polymers exhibiting improved properties of solvent and heat resistance, as well as dimensional stability.

Other objects of the invention will in part be obvious and will in part appear hereinafter.

These and other objects of the present invention can be attained through practice of a process which comprises the steps of (A) forming a cross-linkable pre-polymer mixture, the sulfone polymer molecules of which contain at least two vinyl-sulfone groups by reacting a sulfone starting material or acceptor component selected from the class consisting of monosulfones represented by the formula:

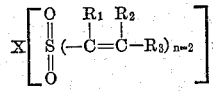

and polysulfones represented by the formula:

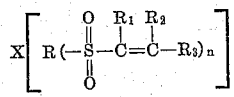

with less than a stoichiometric quantity of an active hydrogen containing compound or donor component selected from the class consisting of polyhydric alcohols, and monosubstituted amines represented by the formula:

$$X_1[R(-ZH)_{n1}]$$

and amines represented by the formula:

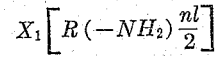

the said quantity being such that the ratio of $n.X$ to $n_1.X_1$ is greater than unity,

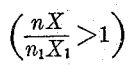

and wherein $n$ and $n_1$ represent integers of at least 2 and X and $X_1$ represent numbers of moles of each reactant and thereafter (B) cross-linking the said sulfone pre-polymer mixture to provide a thermoset polymer by reacting the same in the presence of a free radical initiator, and, wherein R is selected from the class consisting of organic radicals having a valence of 2–6 and free of reactive functional groups, $R_1$, $R_2$ and $R_3$ are selected from the class consisting of hydrogen, alkyl and aryl radicals, and Z is selected from the class consisting of monosubstituted nitrogen, and oxygen.

The following examples are entered in illustration of the invention. Where parts are mentioned, parts by weight are intended unless otherwise described.

EXAMPLE I

A. *Pre-Polymer Preparation*

A solution of 0.015 g. (0.000625 mole) of sodium hydride dissolved in 16.22 g. (0.18 mole) of 1,4-butanediol is prepared. This solution is slowly added to a stirred flask containing 28.36 g. (0.24 mole) divinyl sulfone. After the addition of 5–7 ml. of the 1,4-butanediol solution there is a rapid rise in temperature from 24° C. to 90° C. The addition of 1,4-butanediol solution is continued under stirring at a rate designed to maintain the temperature between 70° C. and 90° C. When addition is complete, the reaction mixture is heated to 120° C. and held at that temperature for 2 hours. The reaction product is then cooled to room temperature, and is observed to be a light yellow to colorless viscous syrup which can be poured at room temperature.

An analysis of the hydroxyl content of the pre-polymer mixture by acetylation with acetic anhydride in pyridine shows that 95% of the hydroxyl groups originally present have been reacted. From this, the average molecular weight of the pre-polymer molecules is calculated to be about 700 and, to contain two vinyl-sulfone groups. When tested by IR spectrum analysis the presence of free vinyl groups and ether linkages is evidenced.

B. *Cross-Linking Step*

A 7 g. portion of the pre-polymer is mixed with 3.0 g. of methyl methacrylate followed by addition to the solution which results of 0.1 g. methyl ethyl ketone peroxide. The resulting liquid is poured into a mold and heated first for 5 minutes at 80° C. and then for 60 minutes at 120° C. The casting which results is solid, and evidences a clear, yellow coloration. The casting is subjected to a temperature of 250° C. and it becomes rubbery, but, does not flow, evidencing extensive cross-linking has taken place.

EXAMPLE II

A. *Pre-Polymer Preparation*

Two solutions, constituting of 9.55 g. (0.09 mole) diethylene glycol and 2.76 (0.03 mole) glycerin dissolved in 20 ml. 1,2-dimethoxyethane and the other 21.27 g. (0.18 mole) divinyl sulfone dissolved in 15 ml. of 1,2-dimethoxyethane are prepared under essentially anhydrous conditions. About 5 ml. of the glycol solution is first reacted with 0.02 g. of sodium hydride to produce a reaction product which is designed to serve as basic catalyst, and the same is added slowly to the divinyl sulfone solution. The remainder of the glycol solution is added over a period of 30 minutes. The reaction is exothermic in nature and the temperature is maintained between 30°–40° C. by applying cooling. After addition is complete, the resulting solution is maintained under stirring for an hour. Thereafter, 4 drops of acetic acid plus a few crystals of hydroquinone are added to stabilize the resulting resin against further reaction. At that point, the solvent which remains is removed under vacuum of 30 mm. Hg at 40° C. The residue remaining is a light yellow viscous oil which absorbs about 20% by weight of water, is soluble in acetone, and insoluble in dioxane, benzene, ethanol, and tetrahydrofuran. When the IR spectrum of the pre-polymer syrup is taken and compared to that of the unreacted starting mixture, it evidences marked reducton in hydroxyl group absorption, strong absorption due to new ether linkages and retention of some vinyl linkages. The pre-polymer molecules are calculated to have a molecular weight of about 1,100 and three vinyl-sulfone groups.

B. *Cross-Linking Step*

A 10 g. portion of the pre-polymer resin is intimately mixed with 0.1 g. tertiary butyl perbenzoate, and the liquid mixture poured into a mold and heated at 120° C. for 60 minutes, followed by heating at 140° C. for 180 minutes. The mold is allowed to cool to room temperature and the molded form removed. The form is a rubbery, brown solid, which is highly resistant to tearing and cannot be dissolved by acetone.

EXAMPLE III

A. *Pre-Polymer Preparation*

A solution of 0.015 g. (0.000625 mole) sodium hydride dissolved in 13.42 g. (0.10 mole) of 1,2,6-hexanetriol is prepared and is slowly added to a stirred flask containing 29.54 (0.25 mole) of divinyl sulfone. After the addition of a few ml., an orange color appears followed by a sharp rise in temperature from 25° C. to 80° C. The reaction mixture then becomes colorless and addition is completed while maintaining the temperature between 65–100° C. The colorless syrup is stirred at 120° C. for 2 hours and upon cooling becomes a clear, colorless, tacky syrup which flows stiffly at room temperature.

Acetylation values of the syrup with acetic anhydride in pyridine indicate that 88% of the hydroxyl groups originally present have been reacted. When tested by IR spectrum analysis the presence of free vinyl groups and ether linkage is noted. The pre-polymer molecules are calculated to have more than two vinyl-sulfone groups.

B. *Cross-Linking Step*

Ten grams of the pre-polymer is mixed with 3 g. of styrene comonomer and 0.2 g. of benzoyl peroxide. The mixture is stirred until the peroxide becomes dissolved. The liquid is poured onto a polished metal plate to form a thin film and placed in an oven. Heat is applied, first at 60° C. for 5 minutes, followed by 100° C. for 30 minutes. A rubbery, continuous film results, which on cooling is peeled off the plate. The film is light yellow to colorless and resists attack by hot acetone.

EXAMPLE IV

A. *Pre-Polymer Preparation*

A solution of 15.54 g. (0.18 mole) piperazine dissolved in 75 ml. warm dioxane, is slowly added with stirring to 28.36 g. (0.24 mole) of divinyl sulfone. An exothermic reaction results on addition. After addition is complete, the reaction mixture is refluxed for 1 hour at atmospheric pressure. On evaporation of the solvent, a viscous liquid remains. When the IR spectrum of this liquid is taken, the (a) presence free vinyl groups and (b) virtual absence of secondary amine groups is noted. The molecular weight can be calculated as about 730. The number of vinyl-sulfone groups per pre-polymer molecule is calculated at two.

B. *Cross-Linking Step*

A 7 g. portion of the pre-polymer is mixed with 1.5 g. of ethyl acrylate and 0.2 g. azo-bis-isobutyronitrile. Stirring is continued until a clear solution is obtained. The solution is poured into a mold, rapidly heated to 90° C. and maintained at the same temperature for 60 minutes. The casting swells to about three times its original volume, to give a semi-rigid resilient foamed material. When the foamed shape is heated to 250° C. it does not collapse, but rather maintains its foamed structure. Neither is there collapsing or dissolving of the same when the shape is immersed in acetone for 24 hours.

EXAMPLE V

A. *Pre-Polymer Preparation*

A mixture of 15.01 g. (0.10 mole) of triethylene glycol, 66.8 g. (0.20 mole) 4,4' di(vinylsulfonyl)diphenyl is added to 200 ml. of dimethoxyethane and heated to the boiling point. The mixture is cooled to 40° C. and 1 ml. of a 10% solution of potassium tertiary butoxide in tetrahydrofuran is added with vigorous agitation to give an exothermic reaction. The reaction mixture is then heated to reflux and so maintained for 2 hours. On evaporation of the solvent, an extremely viscous liquid is isolated which solidifies to a low melting solid on standing for a week.

When subjected to IR spectrum analysis, the liquid pre-polymer resin product evidences (a) presence of free vinyl groups and (b) an increase in ether linkages over those evidenced in starting materials. Acetylation values of the liquid product by the acetic acid and pyridine method indicates that 8% of the hydroxyl groups remain unreacted. The number of vinyl-sulfone groups in the pre-polymer molecules are calculated at two.

B. *Cross-Linking Step*

An 8 g. sample of the pre-polymer resin above is mixed with 1.0 ml. of methyl acrylate, 1.0 ml. of styrene and 0.1 g. of hydrogen peroxide. The liquid mix is poured into a mold and cured at 60° C. for 60 minutes followed by 100° C. for 180 minutes. On cooling, the casting is removed from the mold. The molded shape is tough and resilient having good dimensional stability, and resists attack by hot acetone.

EXAMPLE VI

A. *Pre-Polymer Preparation* n-Amyl amine in the amount of 1.74 g. (0.02 mole) is added to a mixture of 9 g. (0.03 mole) of 2,4 di(propenylsulfonyl)toluene in 60 ml. of dioxane initially at room temperature. This is paralleled by a rise in temperature up to 40° C. After addition is complete the reaction mixture is refluxed for 60 minutes. Thereafter solvent is evaporated at 30 mm. Hg and 50° C. The residue which remains is an extremely viscous, amber, liquid pre-polymer resin product which shows free olefinic groups, and a trace of unreacted amino-hydrogen. The molecular weight of the product is about 1000.

B. *Cross-Linking Step*

A five gram portion of the pre-polymer product above is mixed with 1.0 g. of styrene and 0.1 g. of benzoyl peroxide. The liquid mixture is poured into a mold and cured at 90° C. for 120 minutes. The casting is removed on cooling and evidences a clear, colorless and rubbery nature, which remains substantially unaffected when immersed in hot acetone.

The present invention is directed to a two-step process by which to produce thermoset sulfone polymers. In the first step, a cross-linkable pre-polymer mixture is produced, which contains at least two vinyl-sulfone groups in the molecules thereof. This is followed by the second step in which the pre-polymer is cross-linked to produce the desired thermoset sulfone polymers.

More particularly, the process of the present invention constitutes (A) forming a cross-linkable pre-polymer mixture comprising sulfone polymer molecules having at least 2 vinyl-sulfone groups in the said molecules, by reacting a sulfone starting material or acceptor component selected from the class consisting of monosulfones represented by the formula:

$$X\left[\begin{array}{c}O\ R_1\ R_2\\ \|\ |\ |\\ S(-C=C-R_3)_{n=2}\\ \|\\ O\end{array}\right]$$

and polysulfones represented by the formula:

$$X\left[\begin{array}{c}O\ R_1\ R_2\\ \|\ |\ |\\ R(-S-C=C-R_3)_n\\ \|\\ O\end{array}\right]$$

with less than a stoichiometric quantity of an active hydrogen-containing compound or donor component selected from the class consisting of polyhydric alcohols, and monosubstituted amines represented by the formula:

$$X_1[R(-ZH)_{n_1}]$$

and amines represented by the formula:

$$X_1\left[R(NH_2)_{\frac{n_1}{2}}\right]$$

the said quantity being such that the ratio of $n.X$ to $n_1.X_1$ is greater than unity $$\left(\frac{nX}{n_1X_1}>1\right)$$

and wherein $n$ and $n_1$ represent integers of at least 2 and $X$ and $X_1$ represent numbers of mols of each reactant and thereafter (B) cross-linking the said sulfone pre-polymer mixture by reacting the same in the presence of a free-radical initiator, wherein R is selected from the class consisting of organic radicals having a valence of 2–6 free of reactive functional groups $R_1$, $R_2$ and $R_3$ are selected from the class consisting of hydrogen, alkyl and aryl radicals, and Z is selected from the class consisting of monosubstituted nitrogen and oxygen.

A. *Discussion of the Preliminary Step Directed to Production of Cross-Linkable Sulfone Pre-Polymer*

The sulfone starting material, or acceptor compounds used in production of the pre-polymer contains a sulfone group $$\begin{array}{c}O\\ \|\\ (-S-)\\ \|\\ O\end{array}$$

group or groups adjacent to terminal ethylenic $$\left(\begin{array}{c}R_2\ R_1\\ |\ |\\ C=C-\\ |\\ R_3\end{array}\right)$$

groups. Wherein $R_1$, $R_2$ and $R_3$ are selected from the class consisting of hydrogen, alkyl and aryl groups. The first group of these materials are the monosulfones which can be represented by the formula:

$$\left[\begin{array}{c}O\ R_1\ R_2\\ \|\ |\ |\\ S(-C=C-R_3)_{n=2}\\ \|\\ O\end{array}\right]$$

wherein $R_1$, $R_2$ and $R_3$ are selected from the class consisting of hydrogen, alkyl and aryl groups. In the case of monosulfones then, a single sulfone group separates two terminal ethylenic groups. Specific examples of the monosulfones include divinyl sulfone, propenyl sulfone, isopropenyl sulfone, (alpha-ethyl vinyl)sulfone, (alpha-n-propyl vinyl)sulfone, 1-butenyl sulfone, (alpha-phenyl vinyl)sulfone, styryl sulfone, etc.

The polysulfone starting materials can be represented by the formula:

$$\left[\begin{array}{c}O\ R_1\ R_2\\ \|\ |\ |\\ R(-S-C=C-R_3)_n\\ \|\\ O\end{array}\right]$$

wherein R is selected from the class consisting of organic radicals having a valence of 2–6 and free of functional groups, $R_1$, $R_2$ and $R_3$ are selected from the class consisting of hydrogen, alkyl and aryl groups and $n$ represents an integer of at least 2. The polysulfones starting materials then contain greater than one sulfone group. Specific examples of the polysulfone starting materials include 1,4-bis(vinyl sulfonyl)butane, bis(beta,beta'-vinyl sulfonyl)ethyl ether, 4'di(vinyl sulfonyl)diphenyl, 2,4,6-tri(vinyl sulfonyl)toluene, 2,2',4,4,4'-tetra(vinyl sulfonyl)diphenyl, 1,2-di(vinyl sulfonyl methoxy)ethane, etc.

The active hydrogen containing compound or donor component which is reacted with the acceptor component in order to produce the pre-polymer can be selected from the class consisting of polyhydric alcohols, and monosubstituted amines represented by the formula:

$$[R(-ZH_2)_{n_1}]$$

and amines represented by the formula:

$$[R(-ZH)_{n_1}]$$

wherein R is selected from the class consisting of organic radicals having a valence of 2–6 and free of functional groups, Z is selected from the class consisting of monosubstituted nitrogen and oxygen, $n_1$ represents an integer of at least 2.

Specific donor compounds include within the polyhydric alcohols: ethylene glycol, 2,3-butylene glycol, diethylene glycol, tetramethylene glycol, decamethylene glycol, glycerine, hydroquinone, resorcinol, catechol, 4,4'-dihydroxy diphenylmethane, phloroglucinol bis-(beta-hydroxyethyl)adipamide; bis - (beta-hydroxyethyl)sulfone; as well as monosubstituted amines such as; 1,6-hexamethylene diamine, p-xylylene diamine, 1,3-propane diamine, p-phenylene diamine; and amines represented specifically by: piperazine, tetraethylene triamine, N,N'-diethyl paraphenylene diamine, N,N'dimethyl ethylene diamine, and mixtures of the same.

In the formation of the pre-polymer, the acceptor component is reacted with less than a stoichiometric quantity of donor component. In this manner, the pre-polymer molecules which will result from the reaction will contain at least two vinyl sulfone groups. With the occurrence of side chains on the pre-polymer molecules, the number of vinyl-sulfone groups can be greater than two in number.

The prescribed reactions can be illustrated relative to specific intsances. First, in relation to a monosulfone starting material:

$$5CH_2=CH-SO_2-CH=CH_2 + 4HO-CH_2-CH_2-OH \longrightarrow$$
Divinyl sulfone     Ethylene glycol $$CH_2=CH-SO_2[-CH_2-CH_2-CH_2CH-O-CH_2-CH_2-SO_2-]_4CH_2=CH$$
Sulfone pre-polymer Then with respect to a polysulfone starting material:

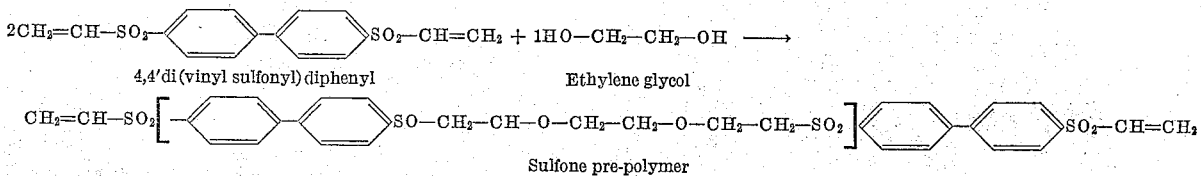

These specific instances can be represented then in a generic fashion. Taking the first instance above, and assigning the values there as follows $X=5$, $n=2$, $X_1=4$ and $n_1=2$ then the ratio $$\frac{Xn}{X_1 n_1} = \frac{10}{8} > 1$$

The generic reproduction for the reaction then is as follows:

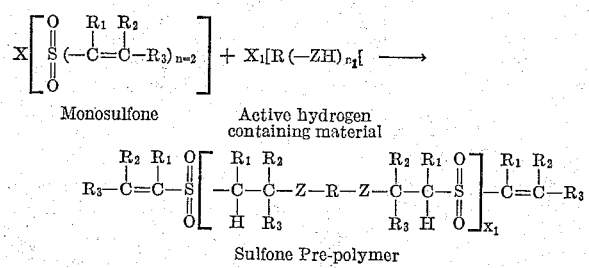

In similar fashion with respect to the reaction of the polysulfone above, the values for $X=2$, $X_1=1$ and the $n_2=2$ and ratio $$\frac{Xn}{X_1 n_1} = \frac{4}{2} > 1$$

This reaction can be generically represented as:

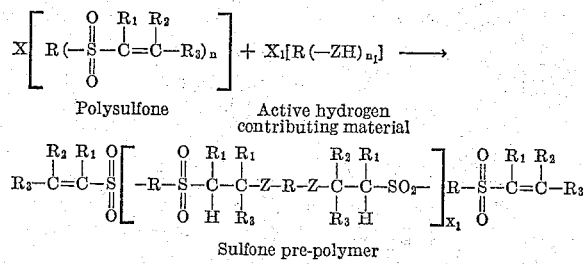

Throughout the generic representation above, R represents an organic radical having a valence of 2–6 and free reactive functional groups, $R_1$, $R_2$ and $R_3$ represent either hydrogen, alkyl or aryl radical, Z represents monosubstituted nitrogen or oxygen, $n$ and $n_1$ represent integers of at least 2 and X and $X_1$ represent numbers of moles of the sulfone starting material and active hydrogen contributing compound, respectively.

The pre-polymer formation reaction is carried out as a catalytic reaction. When the donor component is either a polyol or water, a strong base is used. Strong bases which are useful as catalysts here include quaternary ammonium hydroxides, such as trimethyl benzyl ammonium hydroxide; alkali and alkaline earth metals, oxides, hydroxides, hydrides and carbonates as exemplified by potassium, potassium hydroxide, sodium hydride and potassium carbonate, potassium tertiary butoxide, butyl lithium, calcium oxide, barium oxide, etc. The amounts of strong basic catalysts to be used are preferably minute, as little as 0.01 of a mole percent based on the total number of moles of reactants can be used. When the donor component is an amine no catalyst is needed.

The pre-polymer formation reaction can be carried out at any convenient temperatures and pressures. The reaction is exothermic and necessary precautions should be exercised. Heating can be carried out after the reaction is no longer exothermic in order to insure completion of reaction and expenditure of reactants. The reaction can be carried out in nonreactant solvents such as dioxane, acetone, chloroform, benzene, etc. or in mass. The pre-polymer can be retained in the solvent, when the same is used, or extracted from the same.

Additives and adducts can be used to stabilize the pre-polymer mixture, as for instance by addition of sufficient acid to neutralize the catalyst. Since the pre-polymer mixture contains free vinyl groups in the molecules thereof free-radical inhibitors such as hydroquinone, tertiary butyl catechol, etc., can be used to advantage where cross-linking of the pre-polymer is to be postponed. It bears emphasis that the pre-polymer mixture to be effective for later cross-linking must contain these free vinyl or more particularly free vinyl-sulfone groups.

The pre-polymer mixture is made up of low molecular weight polymer molecules containing free vinyl sulfone groups. This gives a pre-polymer mixture which is either (a) liquid in nature or (b) easily dissolved in solvents such as water or organic solvents to give liquids, in either case having relatively low viscosities facilitating handling of the same preparatory to their being cross-linked. For this reason, they can be poured easily into molds, interstices, onto laminate substrates, etc., anticipatory to their being cross-linked into a permanent, hardened condition. Specifically, the pre-polymers should have molecular weights ranging from 300 to 5,000.

B. Cross-Linking Step

The sulfone pre-polymer product constituted of low molecular weight polymers and containing free vinyl sulfone groups in the polymer molecules thereof is cross-linked by reacting the same in the presence of a free-radical initiator.

The free-radical initiators which can be used will include first, peroxides. These are represented by the organic superoxides, alcoholic peroxides and acidic peroxides. Among those preferred are benzoyl peroxide, acetyl peroxide, succinic peroxide, cumene hydroperoxide, hydrogen peroxide, methyl ethyl ketone peroxide, tertiary butyl perbenzoate, lauric peroxide, stearic peroxide, ascaridole, ditertiary butyl peroxide, tertiary butyl hydroperoxide, cyclohexanone peroxide, 2,4-dichlorobenzoyl peroxide, etc. The azo-bis catalysts such as azo-bis isobutyronitrile, etc. The amount of catalysts to be used need only be rather small, with 0.1–2.0 percent on the total reactants performing quite well. Actually, lesser or greater amounts of catalyst can be used, and some variation can be expected due to choice of catalyst. When fillers or inhibitors are included in the pre-polymer resin mixtures, greater amounts of catalyst than those indicated can be used to good advantage.

The cross-linking reaction can be restricted in reactants to the pre-polymer itself. In this regard, the reaction can be considered as homopolymerization. It is equally contemplated and many times preferred to include other comonomers which are compounds preferably having medium polymerization reactivity and being liquid or soluble in nature. Comonomers which can be used for this purpose include styrene alpha-chloro styrene, vinyl naphthalene, acrylates, methacrylates, acrylic and methacrylic acids, acrylonitrile, vinyl toluene, etc. The amounts of comonomer which can be used will vary dependent upon the properties desired in the final cross-linked sulfone polymer or copolymer. Generally, 10 to 30% by weight of total composition of comonomer is preferred.

The cross-linking reaction can utilize other polymerization aids such as accelerators which are exemplified by organic salts of cobalt and manganese, and amines. These are used in small amounts. Also various fillers, colorants and the like can be used if desired.

The cross-linking steps can be practiced in a convenient manner and location. The pre-polymer mixtures can be used directly as obtained from the first-step reaction which provides for their formation, or the pre-polymer molecules can be extracted from the product of that reaction and used, and, in either case the pre-polymer can be dissolved, suspended, emulsified or otherwise carried in a liquid or other medium, and in each case can be mixed with the comonomer, if the same is to be used, preliminary to cross-linking. Once the ingredients are mixed, heat can be applied to initiate or facilitate the cross-linking reaction. However, in most cases it is not required to do so. Pressure as well as temperature can be used if desired during the cross-linking reaction.

The cross-linking reaction is adapted to be carried out in any convenient location, such as molds when thermoset castings are to be made, material interstices, surfaces and interfaces when laminating and adhering activities are carried on.

The cross-linked sulfone polymers which eventuate from practice of the present invention have broad utility in application where qualities of thermosetting, dimensional stability and solvent resistance are desired. These will include moldings, laminates, castings, films, fibers, etc.

It will thus be seen that the objects set forth above, among those made apparent from the preceding description, are efficiently attained, and, since certain changes may be made in the above products and in carrying out the process by which they are obtained without departing from the scope of the invention, it is intended that all matter contained in the above description shall be interposed as illustrative and not in a limiting sense.

What is claimed is:

1. A process for producing cross-linked sulfone polymers which comprises the steps of (a) forming a cross-linkable pre-polymer mixture comprising sulfone polymer molecules of low molecular weight containing at least two vinyl-sulfone groups in said molecules, by reacting a sulfone starting material selected from the class consisting of monosulfones represented by the formula:

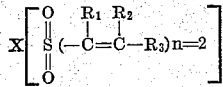

and polysulfones represented by the formula:

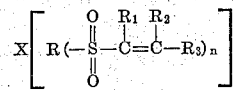

with less than a stoichiometric quantity of an active hydrogen containing compound selected from the class consisting of polyhydric alcohols and monosubstituted amines represented by the formula:

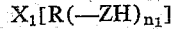

and amines represented by the formula:

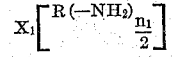

and mixtures of the same, the said quantity being such that the ratio of $n.X$ to $n_1.X_1$ is greater than unity $$\left(\frac{nX}{n_1X_1} > 1\right)$$

and wherein $n$ and $n_1$ represent integers of at least 2 and $X$ and $X_1$ represent members of mols of each reactant and thereafter (B) cross-linking the said sulfone pre-polymer mixture by reacting the same in the presence of a free-radical initiator and wherein R is selected from the class consisting of organic radicals having a valence of 2-6 and free of reactive functional groups, $R_1$, $R_2$ and $R_3$ are selected from the class consisting of hydrogen, alkyl and aryl radicals, and Z is selected from the class consisting of monosubstituted nitrogen and oxygen.

2. The process according to claim 1 wherein cross-linking the said sulfone pre-polymer mixture is effected by reacting the same through a vinyl comonomer.

3. The process according to claim 1 wherein the starting material is divinyl sulfone.

4. The process according to claim 1 wherein the active hydrogen-containing compound is a primary polyhydric alcohol.

5. The process according to claim 1 wherein the free-radical initiator is a peroxide.

6. A process for providing a cross-linked sulfone polymer which comprises the steps of reacting divinyl sulfone with less than a stoichiometric quantity of diethylene glycol and glycerin to produce a pre-polymer having three vinyl-sulfone groups in the molecule of same and cross-linking the said pre-polymer by reacting the same in the presence of tertiary butyl perbenzoate.

7. A process for providing a cross-linked sulfone polymer which comprises the steps of reacting divinyl sulfone with less than a stoichiometric quantity of 1,4-butanediol to produce a pre-polymer having two-vinyl sulfone groups in the molecule of same, and, cross-linking the said pre-polymer by reacting the same with methyl methacrylate in the presence of methyl ethyl ketone peroxide.

8. A process for providing a cross-linked sulfone polymer which comprises the steps of reacting divinyl sulfone with less than a stoichiometric quantity of 1,2,6-hexanetriol to produce a pre-polymer having more than two vinyl-sulfone groups in the molecule of same, and, cross-linking the said prepolymer by reacting the same with styrene comonomer in the presence of benzoyl peroxide.

9. A process for providing a cross-linked sulfone polymer which comprises the steps of reacting divinyl sulfone with less than a stoichiometric quantity of piperazine to produce a pre-polymer having two vinyl-sulfone groups in the molecule of the same, and, cross-linking the said pre-polymer by reacting the same with ethyl acrylate in the presence of azo-bis-isobutyronitrile.

10. A process for providing a cross-linked sulfone polymer which comprises the steps of reacting 4,4-di(vinyl sulfonyl)diphenyl with less than a stoichiometric quantity of triethylene glycol to produce a pre-polymer having two vinyl-sulfone groups in the molecule of the same, and, cross-linking the said prepolymer by reacting the same with methyl acrylate and styrene in the presence of hydrogen peroxide.

11. A cross-linked sulfone polymer produced by the steps of (A) forming a cross-linkable pre-polymer mixture comprising sulfone polymer molecules of low molecular weight containing at least two vinyl-sulfone groups in said molecules, by reacting a sulfone starting material selected from the class consisting of monosulfones represented by the formula:

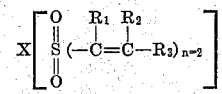

and polysulfones represented by the formula:

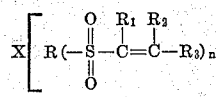

with less than a stoichiometric quantity of an active hydrogen-containing compound selected from the class consisting of polyhydric alcohols and monosubstituted amines represented by the formula:

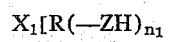

and amines represented by the formula:

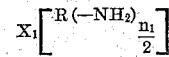

and mixtures of the same, the said quantity being such that the ratio of $n.X$ to $n_1.X_1$ is greater than unity $$\left(\frac{nX}{n_1X_1}>1\right)$$

and wherein $n$ and $n_1$ represent integers of at least 2 and $X$ and $X_1$ represent numbers of mols of each reactant and thereafter (B) cross-linking the said sulfone pre-polymer mixture by reacting the same in the presence of a free-radical initiator and wherein throughout both steps of the said process R is selected from the class consisting of organic radicals having a valence of 2–6 and free of reactive functional groups, $R_1$ $R_2$ and $R_3$ are selected from the class consisting of hydrogen, alkyl and aryl radicals, and Z is selected from the class consisting of monosubstituted nitrogen and oxygen.

References Cited in the file of this patent

UNITED STATES PATENTS

| | | |
|---|---|---|
| 2,623,035 | Schappel | Dec. 23, 1952 |
| 3,031,435 | Tesoro | Apr. 24, 1962 |

FOREIGN PATENTS

| | | |
|---|---|---|
| 650,742 | Great Britain | Feb. 28, 1951 |

UNITED STATES PATENT OFFICE
CERTIFICATE OF CORRECTION

Patent No. 3,153,021            October 13, 1964

Irving Tashlick et al.

It is hereby certified that error appears in the above numbered patent requiring correction and that the said Letters Patent should read as corrected below.

Column 9, lines 67 to 69, the formula should appear as shown below instead of as in the patent:

$$\left(\frac{nX}{n_1 X_1} > 1\right)$$

Signed and sealed this 2nd day of February 1965.

(SEAL)
Attest:

ERNEST W. SWIDER
Attesting Officer

EDWARD J. BRENNER
Commissioner of Patents